(12) United States Patent
McCowin et al.

(10) Patent No.: US 8,640,757 B2
(45) Date of Patent: Feb. 4, 2014

(54) COMPOSITE MATERIAL LAYUP INCLUDING TRIM-ON-THE-FLY

(75) Inventors: Peter D. McCowin, Enumclaw, WA (US); Darrell D. Jones, Mill Creek, WA (US); David P. Banks, Lake Stevens, WA (US); Grant C. Zenkner, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 89 days.

(21) Appl. No.: 13/017,405

(22) Filed: Jan. 31, 2011

(65) Prior Publication Data

US 2011/0192545 A1 Aug. 11, 2011

Related U.S. Application Data

(62) Division of application No. 11/602,893, filed on Nov. 20, 2006, now Pat. No. 7,879,177.

(51) Int. Cl.
*B29C 65/56* (2006.01)
*B29C 65/72* (2006.01)
*B32B 38/04* (2006.01)
*B32B 41/00* (2006.01)

(52) U.S. Cl.
USPC .............. 156/523; 156/510; 156/517

(58) Field of Classification Search
USPC .......... 156/250, 257, 260, 267, 510, 517, 523
See application file for complete search history.

(56) References Cited

U.S. PATENT DOCUMENTS

| | | | |
|---|---|---|---|
| 5,024,862 A * | 6/1991 | Frank | 427/264 |
| 5,813,624 A * | 9/1998 | Grasso et al. | 242/560 |
| 5,954,898 A * | 9/1999 | McKague et al. | 156/64 |
| 5,954,917 A * | 9/1999 | Jackson et al. | 156/433 |
| 6,450,393 B1 * | 9/2002 | Doumanidis et al. | 228/110.1 |
| 6,575,218 B1 * | 6/2003 | Burns et al. | 156/512 |
| 7,964,047 B2 * | 6/2011 | Ishida | 156/145 |
| 2005/0238892 A1 * | 10/2005 | Evans | 428/458 |
| 2006/0073311 A1 * | 4/2006 | Hogg | 428/174 |
| 2009/0101271 A1 * | 4/2009 | Ishida | 156/145 |

FOREIGN PATENT DOCUMENTS

| | | | |
|---|---|---|---|
| EP | 1342555 A1 * | 9/2003 | |
| EP | 1731291 A1 * | 12/2006 | |
| ES | 2144900 A1 * | 6/2000 | |
| WO | WO 2005123386 A1 * | 12/2005 | |

* cited by examiner

Primary Examiner — Sonya Mazumdar (57) ABSTRACT

Disclosed is a method and apparatus for manufacturing multiple layer composite structures and structures containing components made of multiple layer composite structures, comprising dispensing layers of composite material, trimming each layer to its final shape as it is being dispensed, and positioning it properly with respect to prior layers in the part lay-up.

12 Claims, 9 Drawing Sheets

COMPOSITE MATERIAL LAYUP INCLUDING TRIM-ON-THE-FLY

This is a divisional of U.S. Ser. No. 11/602,893, filed 20 Nov. 2006, soon U.S. Pat. No. 7,879,177.

BACKGROUND OF THE INVENTION

1. Field of the Invention

The present invention relates to composite structures and their methods of manufacture, more particularly to structures used in composite aircraft construction.

2. Description of Related Art

Apparatus for the manufacture of structures from layers of composite material are well known. However, for some applications the existing apparatus has certain drawbacks.

Automated Tape Layer (ATL) apparatus places single layers of uncured composite pre-impregnated material on flat or contoured surfaces, but the apparatus is extremely complex and very expensive. The tape dispensed is unidirectional, so when making long, narrow parts where an angled ply or cross ply is needed, the tape laying head must traverse the part once for each width of tape, which makes the process extremely slow.

Another method of manufacturing composite parts is by use of Automated Fiber Placement (AFP) equipment. This is similar in nature to the ATL process discussed above, except that the material used is a thin ribbon or yarn, often referred to as a tow, of pre-impregnated composite material.

U.S. Pat. No. 5,954,917, assigned to the assignee of the present invention, and herein incorporated by reference, comprises a first station having at least one dispensing module, a second station where tape layers that have been deposited on the tool are vacuum treated in order to remove air entrapped between layers of the tape, and a track system which enables movement of the tool between the first and second stations as well as a tool storage station. In the apparatus of this patent and similar apparatus there are two established methods of obtaining the peripheral shape of the part in the form desired. In one method, each layer of composite material is pre-cut to its final dimensions at another station and then is kitted on spools for the final lay-up step. In another method the lay-up is performed with over-sized material, all compaction is performed and the part is either trimmed to shape at that point or cured to it's final condition and then trimmed. When a number of layers of composite material are trimmed, the ultrasonic knives that are customarily used, must travel very slowly.

Another method of manufacturing multiple layer composite parts is hand lay-up of the layers. In this method, the layers are usually trimmed to the proper shape and kitted at one station and then manually aligned with one another to build the lay-up desired. Correct positioning is handled either through physical templates or through projected light templates, usually using a projected laser system. While this method works, it is relatively slow, subject to human error, and not well suited to the production rates found in the manufacture of commercial aircraft.

Thus there is a need for a more efficient means of manufacturing multiple layer composite parts.

BRIEF SUMMARY OF THE INVENTION

According to an embodiment herein, a composite lay-up system comprises a trim table, a feed mechanism for dispensing composite material in a first direction on the trim table, a trim cutter mechanism for cutting the composite material as the material is being dispensed on the trim table, and a lay-up table onto which the cut composite material is laid up. The trim mechanism includes a cutter, a first actuator for moving the cutter linearly in the first direction, and a second actuator, mounted to the first actuator, for moving the cutter across the trim table in a second direction that is orthogonal to first direction. The system can cut the material while it is in motion and in the form of a single layer. This allows very rapid cutting and an increase in production rate over many of the earlier methods used.

While producing substantial increases in production rate over previous designs, many embodiments of this invention are substantially less complex and require correspondingly less capital investment than methods such as Automatic Tape Laying or Automated Fiber Placement.

While many of the embodiments of the present invention create structures that are discernable from those of many of the previous methods due to the manner in which the layers are assembled and cut, the same degree of compaction, strength to weight ratios, and strength to volume ratios are obtainable.

Other features and advantages of the present invention will become apparent to those skilled in the art from a consideration of the following detailed description taken in conjunction with the accompanying drawings.

DETAILED DESCRIPTION OF THE INVENTION

Figure 1:
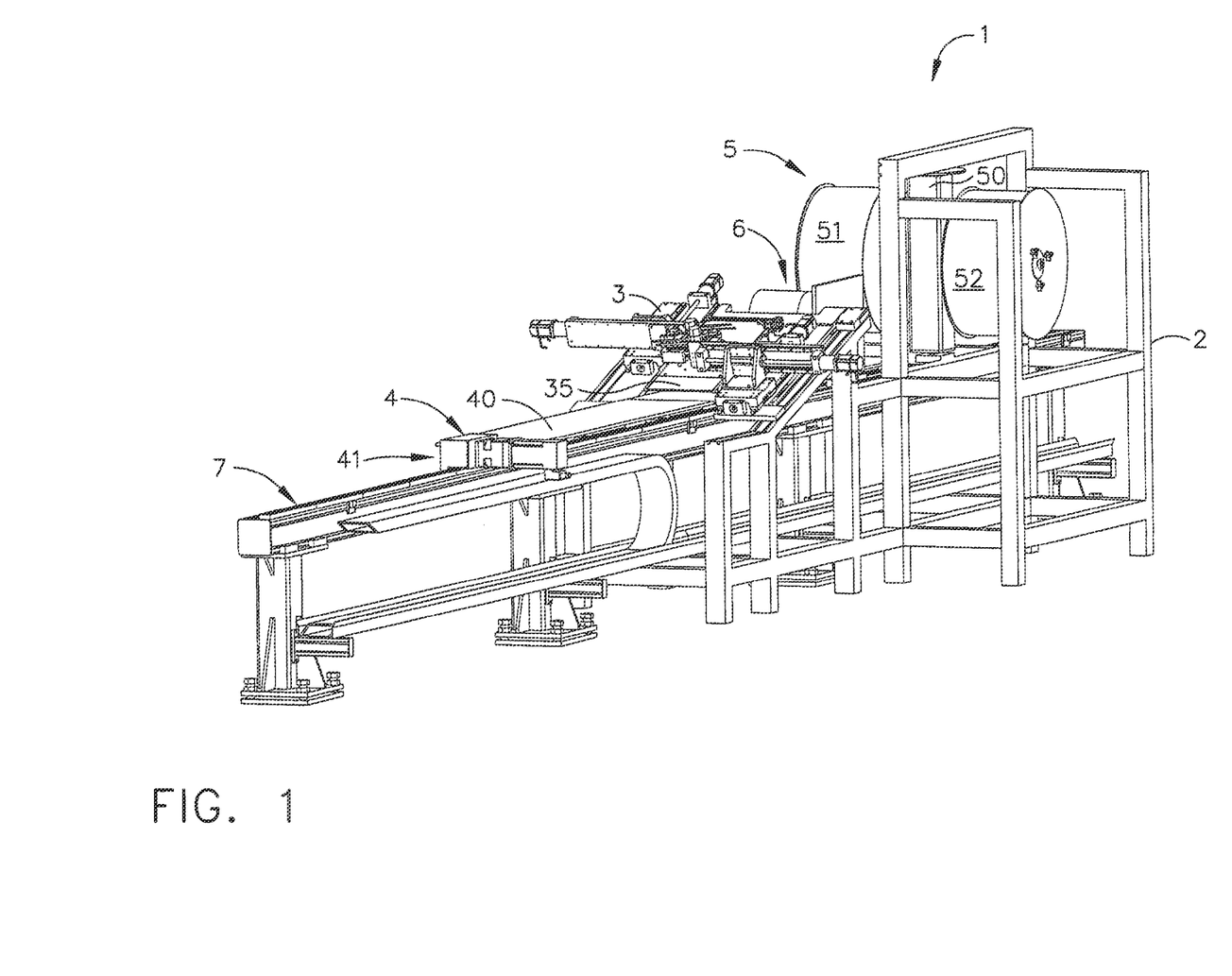
FIG. 1 is an isometric view of one embodiment of the invention.
Figure 2:
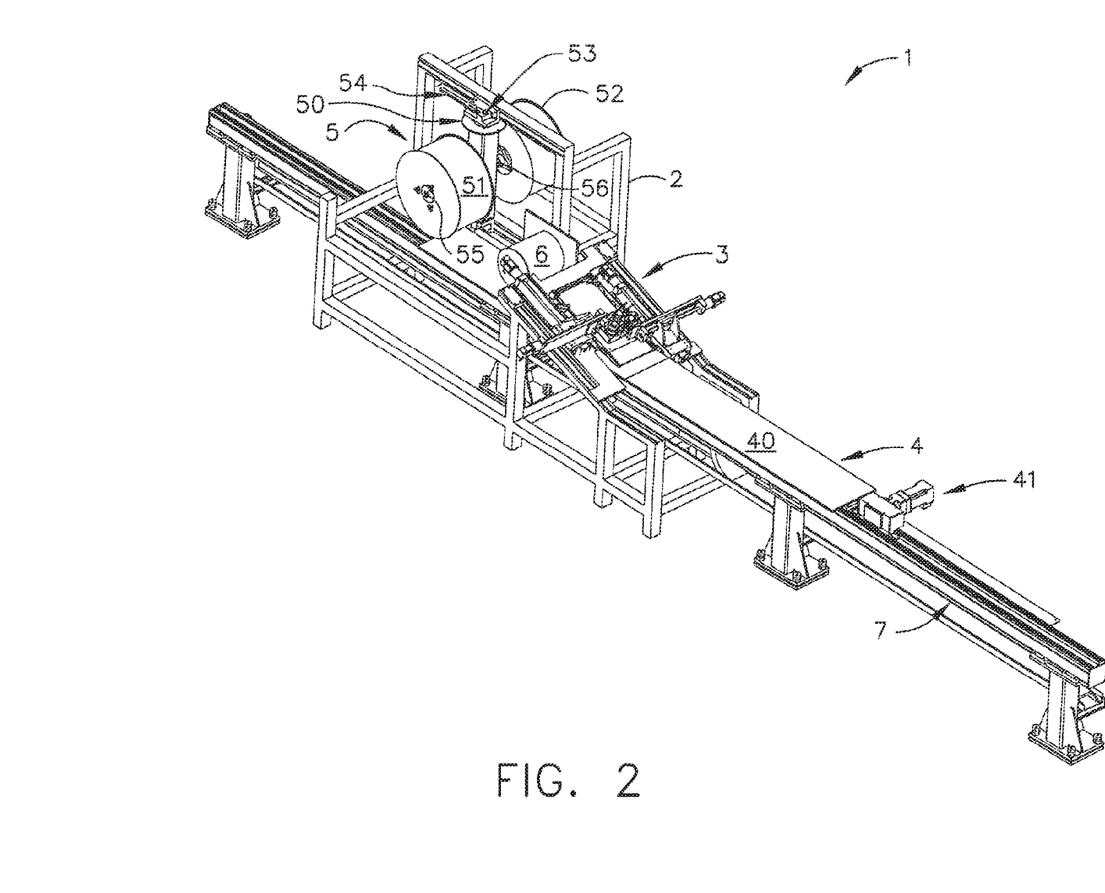
FIG. 2 is a second isometric view of the embodiment of FIG. 1.

Referring particularly to FIGS. 1 and 2 of the drawings, a preferred embodiment of a composite trim and lay-up system is shown at 1. The composite trim and lay-up system 1 may include a frame 2, a material supply system 5, a feed and trim system 3, a lay-up table 4, and a backing material take-up reel 6.

In a number of embodiments, the material supply system 5 may include a supply system pivot 50 with two axles 55 and 56 mounted thereon for removably placing composite material supply reels 51 and 52. The supply system pivot 50 may advantageously have a supply system pivot latch 53 and a supply system pivot lever 54. The system may in some embodiments be configured with a single supply reel, or may have more than two supply reels by arranging them in a carousel or any of a number of other known mechanisms to bring them into the feed position as desired.

Figure 4:
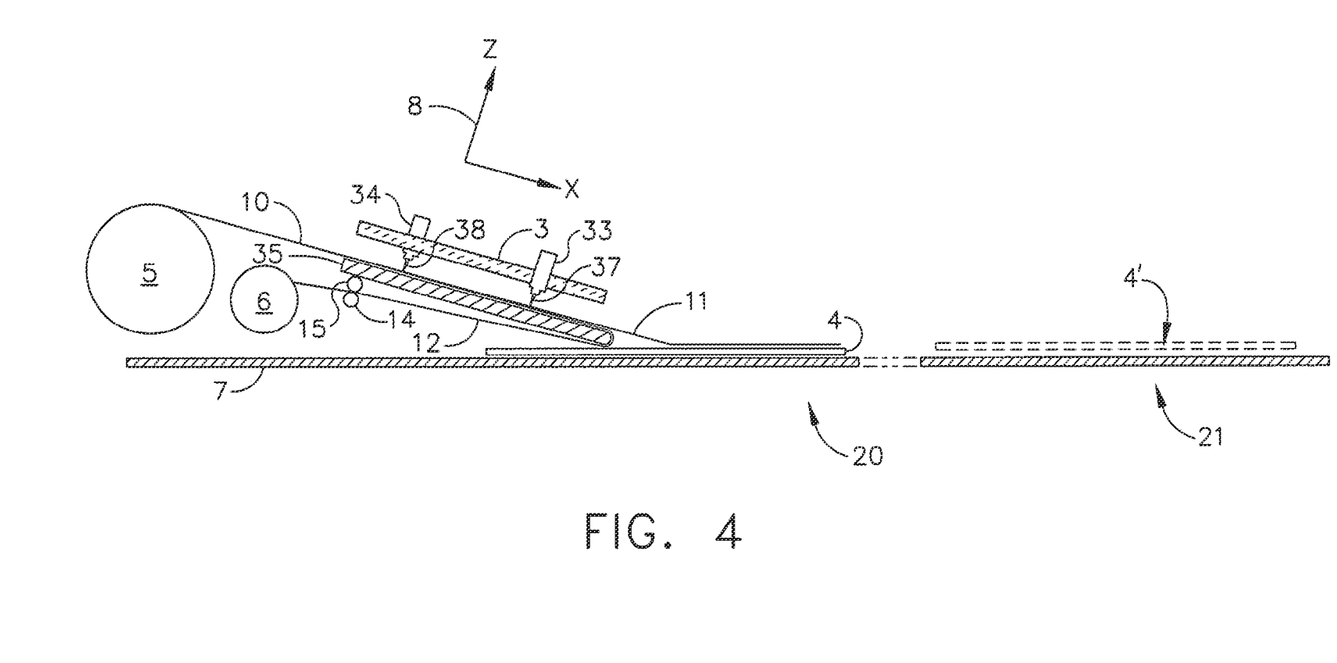
FIG. 4 is a schematic diagram of a composite trim and lay-up system.

As best shown in FIG. 4, a layer of composite material 11 may be attached to a backing material 12, which may be a paper or a plastic film which acts to keep the composite material from adhering to itself when rolled on the composite material supply reels 51 and 52. The composite material may advantageously consist of a ply or plies of fibers or fabric preimpregnated with a plastic resin and supplied in a variety of forms. The combined composite material with backing material is denoted 10 on FIG. 4 and for purposes of this application will be referred to as prepreg. Dry composite material may also be used and filled with resin at a later stage of the process.

Figure 3:
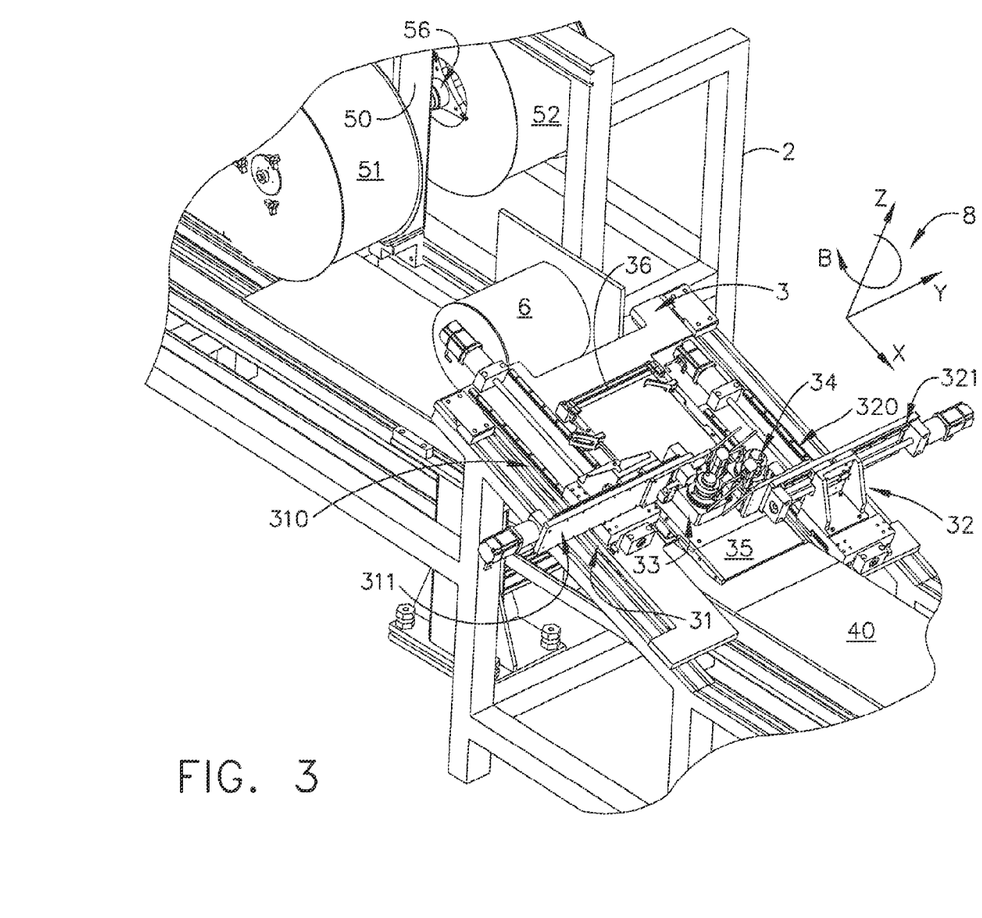
FIG. 3 is a partial isometric view of the embodiment of FIG. 1, illustrating the arrangement of the feed and trim system.

Referring now to FIG. 3, the feed and trim system 3 may include a trim table 35, and may include two trim cutter mechanisms 31 and 32. The trim cutter mechanisms 31 and 32 may comprise linear control axes 310 and 320 in the X direction, 311 and 321 in the Y direction, and 33 and 34 in the Z direction as shown in coordinate system 8. The X axis is in the direction of motion of the material on the trim table 35, the Y axis is transverse to the direction of motion and in the plane of the trim table 35, and the Z axis is normal to the surface of the trim table 35. The feed and trim system may also comprise a rotational axis B about the Z axis. The cutter trim mechanisms 32 and 33 control the positions and rotations of cutters 37 and 38 in FIG. 4, which may be ultrasonic knives.

The Z-axis actuators 33 and 34 are mounted to the Y-axis actuators 311 and 321. The Y-axis actuators 311 and 321 allow movement across the prepreg 10 as it is moving across the trim table 35.

The Y-axis actuators 311 and 321 are coupled to the X-axis actuators 310 and 320, which allow movement of the cutters in the X axis.

The speeds of the X-axis actuators 310 and 320 and of the Y-axis actuators 311 and 321 are controllable and the maximum speed is such that all desired trim cuts can be made within the range of motion of the X-axis actuators 310 and 320 without changing the speed of the prepreg 10 as it is being dispensed. While the embodiment shown utilizes two sets of cutters, if sufficiently complex cuts or a higher speed were required the trim table could be lengthened and additional cutting systems ganged together. Also, it is possible to cut both sides of the composite material 11 with a single cutting system, if the speed of the prepreg 10 is sufficiently low.

As shown in FIG. 4, the feed and trim system 3 may also comprise a drive system which may comprise powered nip rollers 14 and 15. Vacuum system 36, illustrated in FIG. 3, pulls the prepreg 10 down and creates a frictional force which causes the prepreg 10 and the backing material 12 to be under tension between vacuum system 36 and powered nip rollers 14 and 15.

As best shown in FIG. 2, the composite trim and lay-up system 1 may also comprise a backing material take-up reel 6 which may be powered through a slip clutch to maintain tension on the backing material between the take-up reel 6 and the powered nip rollers 14 and 15.

The composite material trim and lay-up system 1 may also comprise a lay-up table 4, having a lay-up surface 40. The lay-up table 4 may ride on a rail 7 and may be driven by a lay-up table driver 41. For some parts it is possible to mount the mold directly to the rail 7 in place of or attached to the lay-up table 4.

Figure 4A:
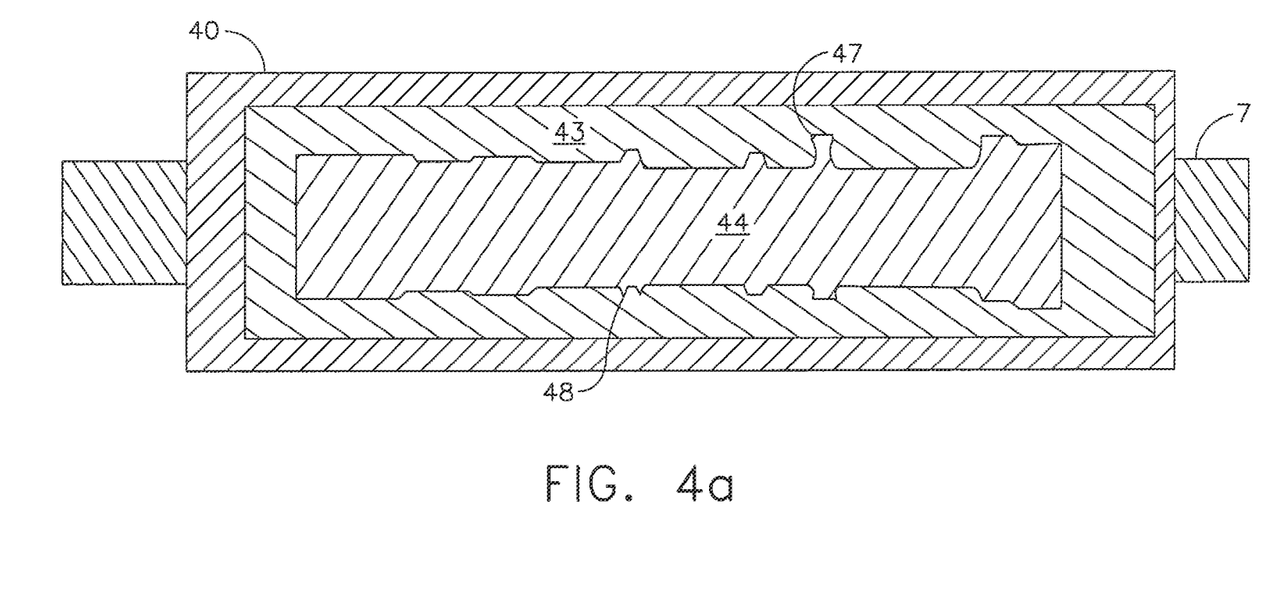
FIG. 4a is a schematic illustration of a typical part on the lay-up table.

As illustrated in FIG. 4a, both the composite material that will become a layer of the final part 44 and that which is scrap 43 may be deposited on the lay-up surface 40. Alternatively, means may be provided to remove the scrap as it comes off the trim table 35. The scrap 43 may be removed from around the part 44 when it is on the lay-up surface 40 either by hand or by any conventional material pick-up machine, such as a vacuum device on a controllable arm. Note that the longitudinal dimension of the part 44 has been compressed in FIG. 4a for ease of illustration and to allow illustration of typical features such as reverse cut 47 and bat ears 48.

It is known in the art of composite structure manufacturing, that the layers of composite material 11 must be compacted together periodically to achieve the desired strength of the final part with minimum weight. This may either be achieved by compaction of each layer as it is deposited or by periodic compaction of a number of layers together. The particular method used depends on a number of factors in the design of the particular part being manufactured, but is commonly accomplished by sealing the part under a bag and drawing a vacuum on the bag to remove air and allow atmospheric pressure to provide the compaction force. As illustrated in FIG. 4, the lay-up table 4 may be moved from a part lay-up station 20 to a part compaction station 21, where it is shown in phantom as 4', for periodic compaction of the composite layers. This station may also advantageously be utilized to unload the part or transfer it to a mold for further processing.

Figure 5:
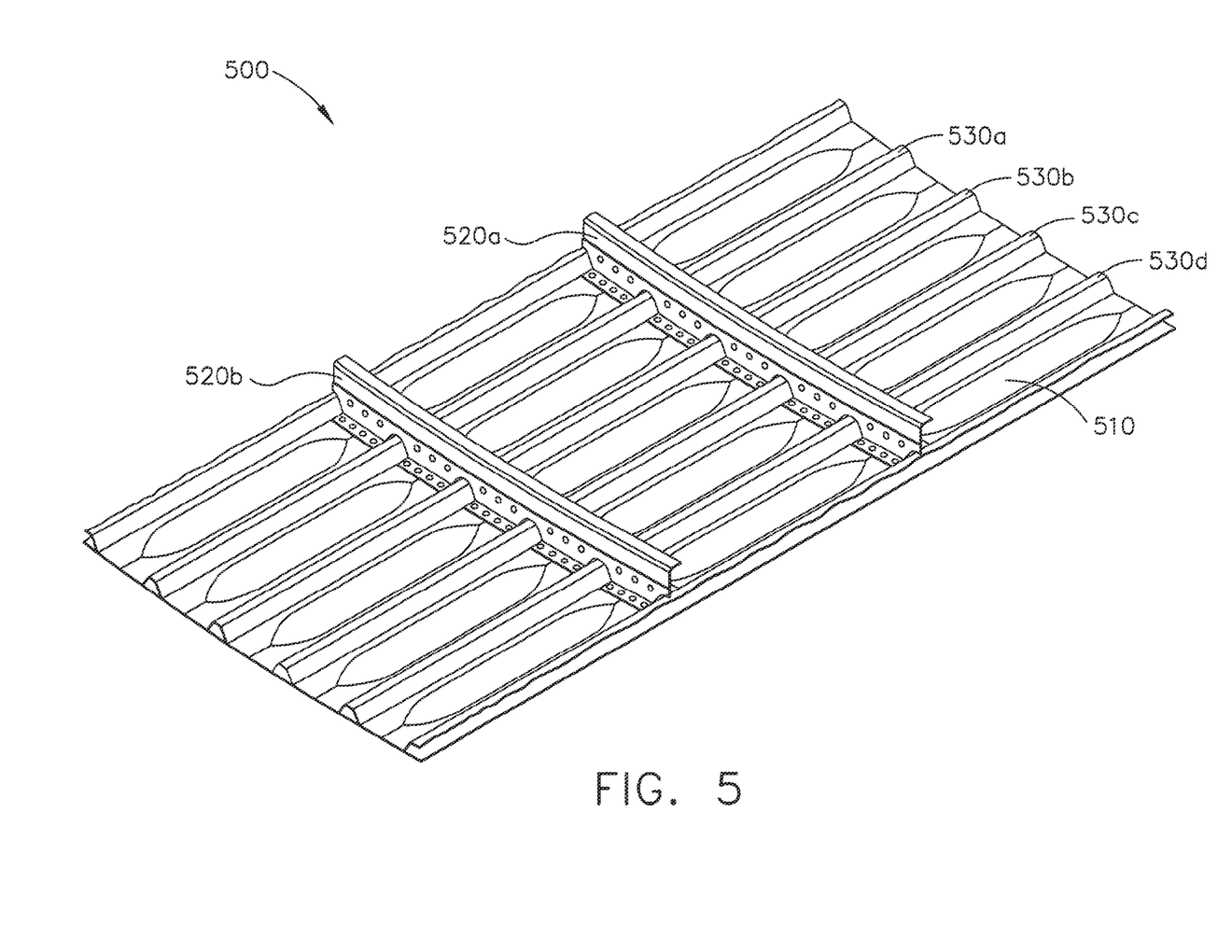
FIG. 5 is a partial isometric view of an aircraft fuselage panel containing parts made in accordance with an embodiment of the invention.

Turning now to FIG. 5, there is illustrated a portion of an aircraft fuselage 500, constructed using an embodiment of the invention. Fuselage stringers 530a, 530b, 530c and 530d are formed of multiple layers of composite material in which the material is dispensed from a material supply system, such as material supply system 5, trimmed to shape with a trim and feed system such as trim and feed system 3, and deposited in the proper position with respect to previous layers on a lay-up table or forming die such as lay-up table 4. When all layers are assembled, the completed composite lay-up may be formed and cured or may be formed and partially cured and attached to fuselage skin 510. The attachment of the fuselage stringers 530a through 530d to the fuselage skin 510 may be through co-curing, adhesive bonding, mechanical fastening, or any other known means of attachment.

Fuselage frames as illustrated by 520a and 520b, may be added after the stringers 530a through 530d are joined to skin 510 or they may all be assembled concurrently.

Of course, the composite trim and lay-up system 1 may be used to make many other parts, such as wing stringers, fuselage frames 520a and 520b, and any number of other parts both inside and outside the aerospace industry.

Figure 6:
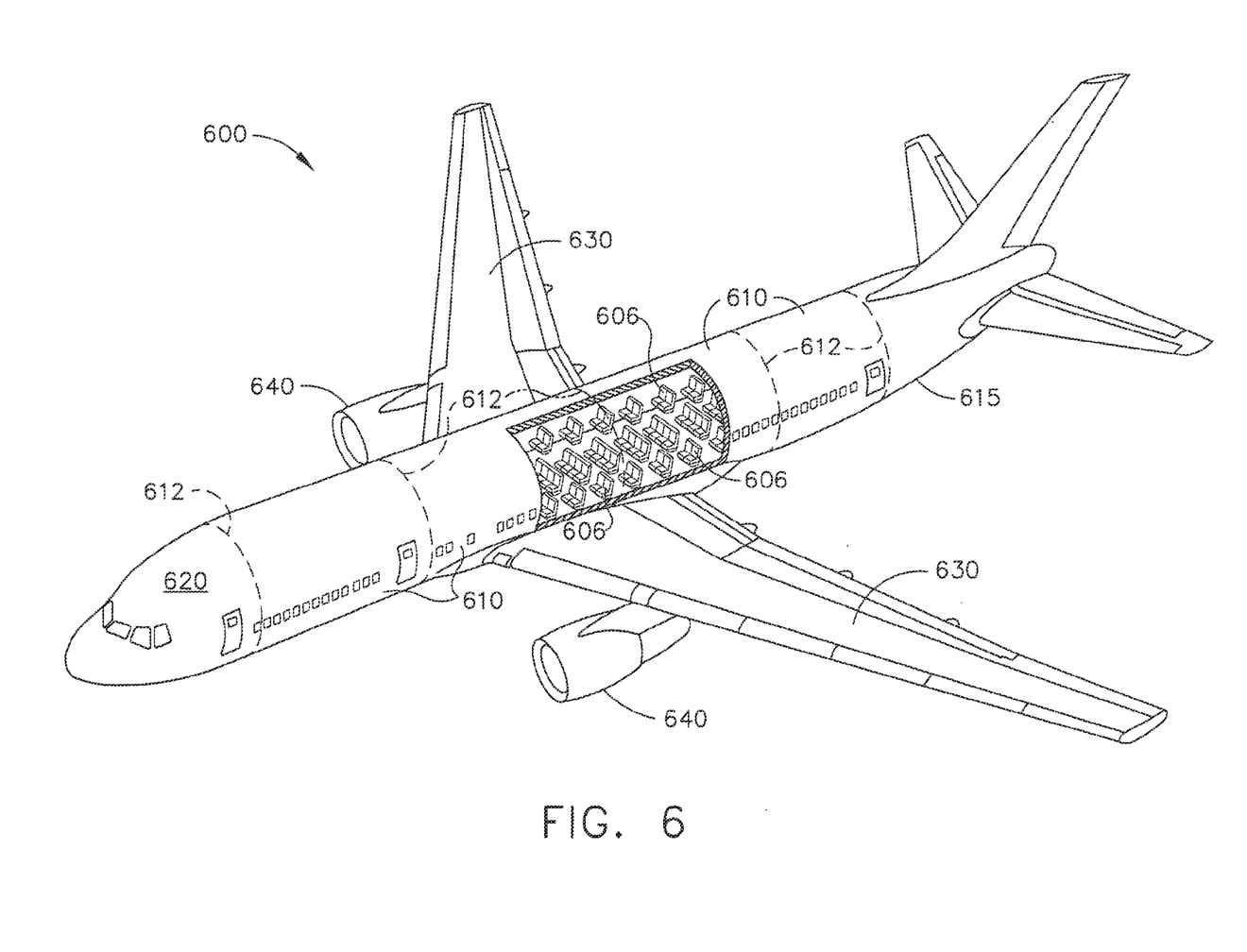
FIG. 6 is an illustration of a representative airplane made in accordance with an embodiment of the invention.

FIG. 6 illustrates an aircraft including a fuselage which may be constructed using an embodiment of the present invention. In particular one or more of fuselage sections 610, cab 620, empennage 615 or wings 630 may advantageously be constructed using the methods discussed for the construction of fuselage section 500 of FIG. 5. The fuselage sections 610 are joined at joints 612 to form the major portion of the fuselage. The cab section 620, the wings 630, empennage 615, engines 640 and landing gear, not shown, are attached, as well as interior systems and components too numerous to name, but well known in the art; to form a complete airplane. If it is desired that the airplane be used to carry passengers, certain other amenities may be added, such as seats 606.

Figure 7:
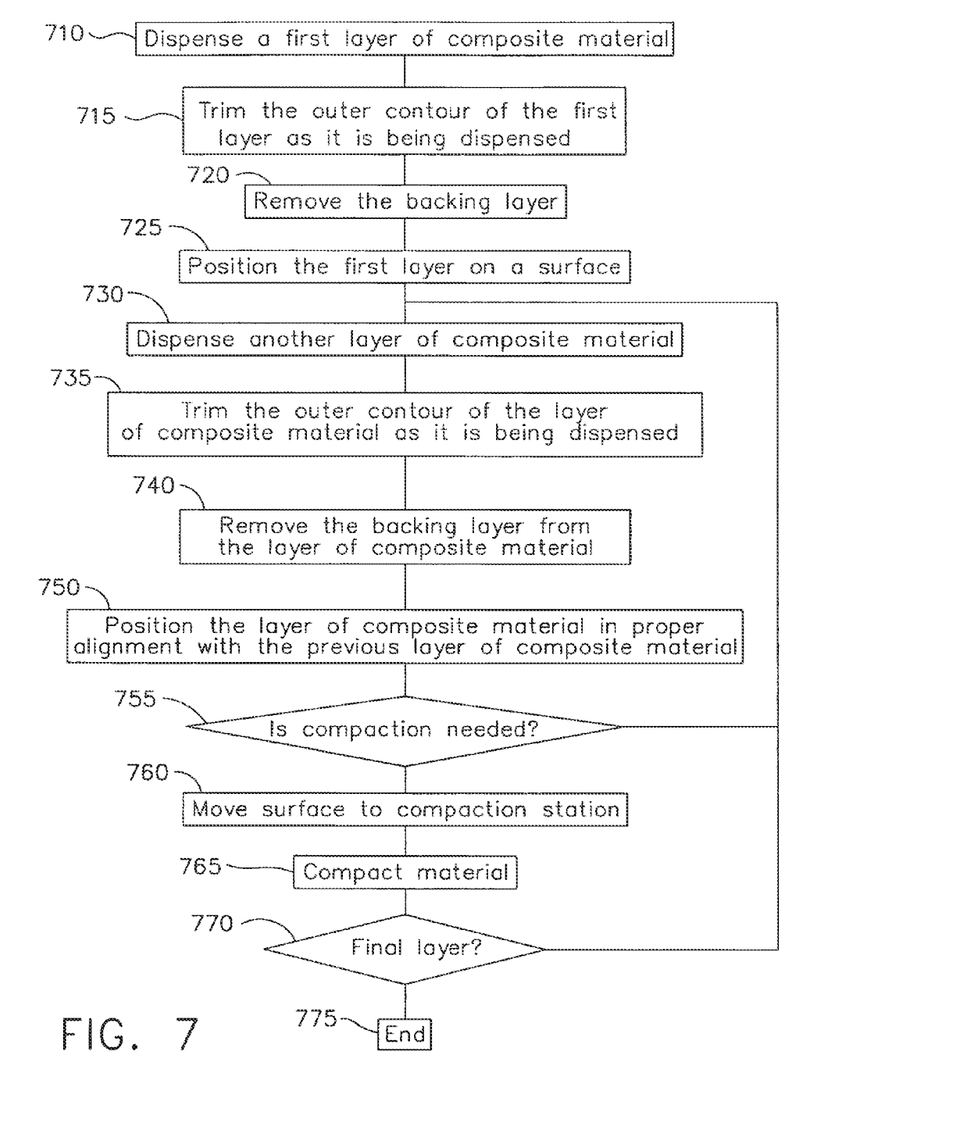
FIG. 7 is a flow chart illustrating an embodiment of the method of the present invention.

We will now describe the operation of the exemplary composite trim and lay-up system 1 utilizing FIG. 7.

In step 710 a first layer of composite material may be dispensed from material supply reel 51 or 52. The two supply reels may each have the same type of prepreg 10 on them, or they may have different forms of prepreg 10. That is one of the material supply reels 51 and 52 may contain composite material 11 with a 0° fiber orientation and the other may contain composite material 11 with a +/−45° fiber orientation. Of course these are only two of many different material configurations that may be stored on the supply reels and other embodiments of the invention may incorporate more supply reels as discussed above. The two material supply reels 51 and 52 may also have a different backing material 12 attached to the same or different composite materials 11.

When the type of material is desired to be changed, or when one of the material supply reel 51, 52 is empty, they may be switched by moving the supply system pivot lever 54 to disengage the supply system pivot latch 53 and rotating the supply system reels 51, 52 about the supply system pivot 50 to place the other reel in position as the active feed reel. Supply system reel axles 55 & 56 may contain a quick release mechanism to allow rapid change of the idle material supply reel 51 or 52.

In step 715 the feed and trim system 3 is used to trim the first layer of composite material 11 as it moves from the material supply reel 51 or 52 to the part lay-up station 20. The trim system 31 may trim one side of the material as it passes over the trim table 35 and the trim system 32 may be used to trim the other side of the composite material 11. The X-axis actuators 310 and 320 control the motion of the cutters 37 and 38 in relation to the speed of the prepreg 10 as it moves across the trim table 35. The relative speeds of the X-axes 310 and 320 and the prepreg 10 are determined in the conversion of the Computer Aided Drawing (CAD) to the part program as discussed later in this application and shown in FIG. 8. The speed of the Y-axis actuators 311 and 321 are controlled in relation to the speeds of their respective X-axis actuators 310 and 311 to achieve the desired form of the layer being cut. The Z-axis actuators 33 and 34 may primarily be two position actuators, though it is preferable that the end positions be adjustable which may be accomplished through a micro-mechanical adjustment. It is necessary that in the cutting position the cutters 37 and 38 cut completely through the composite material 11 without significantly scoring and weakening the backing material 12. To accomplish this, the prepreg 10 may be held snugly against the trim table 35 by the tension created between the vacuum system 36 and the powered nip rollers 14 and 15. B-axis controls may be provided to produce a rotation of the cutters 37 and 38 to align them with their paths of motion with respect to the composite material 11.

In step 720 the backing material is removed from the first layer of composite material. The composite material 11 is relatively stiff when compared with the backing material 12, so when the backing material 12 wraps around the nose of the trim table 35, the peel strength of the bond between the backing material 12 and the composite material 11 is exceeded and they separate from one another. The backing material 12 may be fed between the powered nip rollers which control the speed of the prepreg 10. Tension may be maintained in the system by a drag brake on the material feed reels 51 and 52 and the backing material take-up reel 6 which may be powered through a slip clutch as described above.

In step 725 the first layer of composite material may be deposited on a lay-up surface 40. The position of the lay-up table 4 is controlled by lay-up table drive 41 such that the speed of the lay-up surface 40 and the composite material 10 are the same when the material is being deposited. The start position of lay-up table 4 may be controlled by mechanical stops or may be included in the programming of the machine control system. At the end of depositing the first layer of composite material 11, the feed and trim system 3 may be used to make a complete transverse cut of the composite material 11 to separate the first layer of the part. The lay-up table 4 may then be returned to its start position.

In step 730, another layer of prepreg 10 is then dispensed, the composite material 11 may be trimmed 735, and the backing material 12 may be removed 740. These steps are essentially the same as steps 710, 715 and 720 respectively.

In step 750 the layer may be positioned on the lay-up surface in the proper position with respect to the previous layer. The start position for the leading edge of the scrap 43 for this layer may be the same index location as on the first layer, with the position of the start of the part layer 44 controlled by the feed and trim system 3. Alternatively, the position of the lay-up table 4 may be controlled to a different start position. For parts that require partial length plies, the latter method may result in a significant reduction in the amount of scrap 43 created.

In step 755 a decision is made whether compaction is necessary. If not, the process returns to the material dispensing step and another layer is added in the same fashion. If compaction is needed, in step 760 the lay-up table may be moved from the part lay-up station 20 to the part compaction station 21, and in step 765 the layers may be compacted. Alternatively the system may be designed with the capability to compact the layers at the lay-up station 20. The decision as to whether or not compaction is required may be made during the design of the part by referring to rules for the manufacture of composite parts. It may also be made during the development phase of the part production based on the results obtained with test parts, or it may be made during production of the part based on the results of some means of non-destructive inspection. Alternatively, the decision may be made by a combination of the above methods.

In step 770 when the layers have been compacted, if the final layer has been added, the process is complete, step 775. If the final layer has not been added, the process returns to the material dispensing step 730 and another layer is added in the same fashion.

Figure 8:
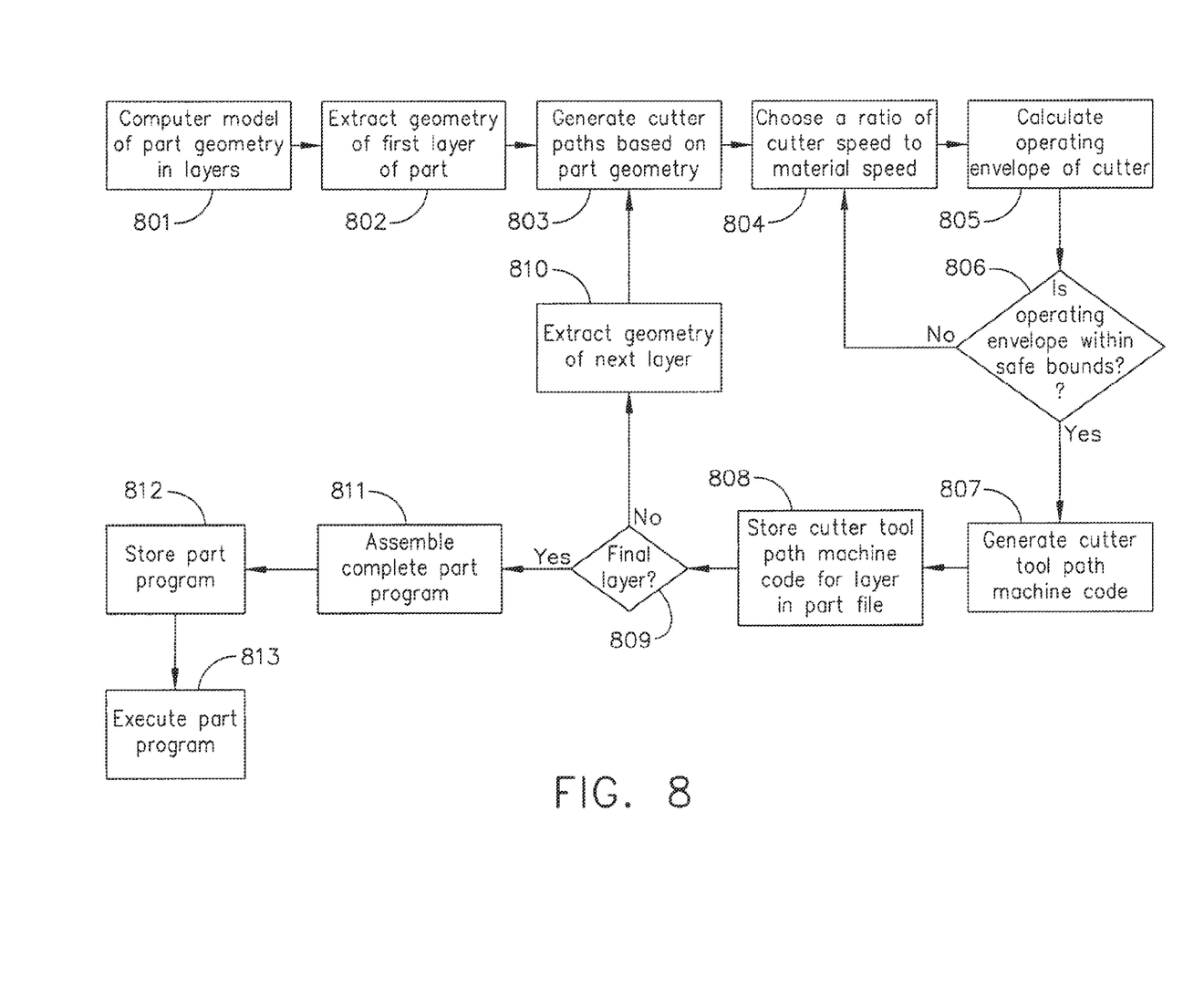
FIG. 8 is a flow chart illustrating one method of generating a part program from the part definition in a Computer Aided Design file.

Turning now to FIG. 8, the definition of the composite part may reside in a computer model 801 which defines the geometry of each layer of the part. For composite parts, this is a necessary condition to obtain the desired strength-to-weight ratios for aerospace applications; since the definition of each layer and each layer's relation to the overall part geometry are critical to the material properties of the part as a whole. In other applications, it is possible that only the overall part geometry would be stored; in which case it would be necessary to add a step of generating the individual layer geometries based on the overall part geometry.

In step 802 the geometry of the first layer is extracted from the overall part definition. This may require a change in the file format to a more convenient format for flat pattern work. Many engineering part definitions are now produced using three-dimensional drawing formats, even when the part is essentially two dimensional in nature. This is done for consistency of the overall electronic definition of the product.

In step 803 the cutter paths are generated from the part geometry. Since the prepreg 10 is moving, this must be done using the relative motions of the prepreg 10, the X-axis actuators 310 and 320, the Y-axis actuators 311 and 321, the Z-axis actuators 33 and 34, and the B-axis actuators.

In step 804 a ratio of cutter speed to material speed is chosen and in step 805 a simulation or other analysis may be conducted to determine the envelope of cutter travel in the X axis, and in step 806 this envelope is compared with a predetermined operating envelope. If the operating envelope is exceeded by the simulation or other analysis, a new ratio of cutter speed to material speed is chosen and the simulation or other analysis is repeated at that new ratio. This process is repeated until the cutters 37 and 38 remain in the operating envelope over the length of the layer. It is possible that some particularly complex parts may require breaking the layer down into smaller longitudinal segments with different ratios of cutter speed to material speed in different segments of the layer.

In step 807 the cutter paths generated in step 803 and the ratio of cutter speed to material speed determined in the previous step are used to generate machine code that will produce the desired cutter path and ratio of cutter speed to material speed. This step may also produce the code necessary to engage and retract the Z-axis actuators 33 and 34, move the lay-up table 4, cut off the ends of the layer, and miscellaneous other control functions necessary to operation of the composite material trim and lay-up system 1.

In step 808 the machine code generated in step 807 is placed in storage.

In step 809, it is determined whether or not the machine code for the final part layer has been generated. If it has not, the geometry for the next layer is extracted in step 810 and the process goes back to step 803 and proceeds to generate the machine code for that layer in the same manner as the previous layer.

When it has been determined in step 809 that the final machine code for the final layer has been generated, in step 811 the machine codes for each of the individual layers are merged into a total part program and the necessary auxiliary commands to start and end the part and transition between layers are inserted.

In step 812 the part program generated in step 811 is stored for later execution in step 813.

While the invention is illustrated for the construction of fuselage components, it is adaptable to the construction of other components as well, such as wing components, empennage components, aircraft cab components, and many non-aircraft components.

Those skilled in the art will understand that the preceding embodiments of the present invention provide the foundation for numerous alternatives and modifications thereto. For example, the trim table need not be flat and the trim mechanisms may then move in more than three axes; other stations may be added to the apparatus to perform additional manufacturing or inspection steps; multiple trimming stations may operate in parallel feeding a single lay-up station; or multiple lay-up stations could be supplied by a single feed and trim system. These other modifications are also within the scope of the present invention. Accordingly, the present invention is not limited to that precisely as shown and described in the present invention.

What is claimed is:

1. A composite lay-up system comprising:
   a trim table;
   a feed mechanism for dispensing composite material in a first direction on the trim table;
   a trim cutter mechanism for cutting the composite material as the material is being dispensed on the trim table, the trim mechanism including a cutter, a first actuator for moving the cutter linearly in the first direction, and a second actuator, mounted to the first actuator, for moving the cutter across the trim table in a second direction that is orthogonal to the first direction; and;
   a lay-up table onto which the cut composite material is laid up.

2. The composite lay-up system of claim 1 further comprising a rail and a driver for moving the lay-up table along the rail, wherein rate of table movement and dispensing rate are the same.

3. The composite lay-up system of claim 1, wherein the lay-up table is controlled to establish a start point for each layer of composite material to position it properly with respect to a previous layer of composite material.

4. The composite lay-up system of claim 1, wherein the lay-up table is shuttled to a second operating location for consolidation of multiple layers of composite material.

5. The composite lay-up system of claim 1 in which the trimming system comprises at least one additional cutter mechanism for cutting in the first and second directions, the cutter mechanisms ganged together.

6. The composite lay-up system of claim 1, further comprising a third actuator, mounted to the second actuator, for moving the cutter normal to a surface of the trim table.

7. The composite lay-up system of claim 6, wherein the third actuator also rotates the cutter about the normal.

8. The composite lay-up system of claim 1, wherein the trim table is tilted with respect to the lay-up table.

9. The composite lay-up system of claim 1 wherein the cutter includes an ultrasonic cutter.

10. The composite lay-up system of claim 1, wherein multi-dimensional trim cuts are made to the dispensed material within the range of motion of the first actuator without changing the speed of the material as it is being dispensed.

11. The composite lay-up system of claim 1, further comprising means for dispensing from either a first supply roll or a second supply roll, the means including a member rotatable about an axis perpendicular to the axes of rotation of the supply rolls to bring one or the other of the supply rolls into position as a feed roll.

12. The composite lay-up system of claim 1, further comprising means for removing a backing from the composite material at an interface between the trim and lay-up tables.

* * * * *